United States Patent [19]

Hernqvist

[11] 3,904,986
[45] Sept. 9, 1975

[54] GAS LASER TUBE

[75] Inventor: Karl Gerhard Hernqvist, Princeton, N.J.

[73] Assignee: RCA Corporation, New York, N.Y.

[22] Filed: Apr. 19, 1974

[21] Appl. No.: 462,506

[52] U.S. Cl. .................... 331/94.5 G; 331/94.5 PE
[51] Int. Cl.² ......................................... H01S 3/09
[58] Field of Search .................................. 331/94.5

[56] References Cited
UNITED STATES PATENTS

| | | | |
|---|---|---|---|
| 3,586,996 | 6/1971 | Milochevitch et al. | 331/94.5 PE |
| 3,766,487 | 10/1973 | Roux | 331/94.5 PE |
| 3,792,372 | 2/1974 | Mark | 331/94.5 PE |
| R28,298 | 1/1975 | Kolb et al. | 331/94.5 G |

Primary Examiner—William L. Sikes
Attorney, Agent, or Firm—Glenn H. Bruestle; Irwin M. Krittman; Joel B. Johnson

[57] ABSTRACT

A tubular, typically glass, portion of a gas-tight envelope is sealed at each end to a metal end member having a central, preferably curved, portion having a precision aperture therethrough. The apertures are sealed by mirrors seated within and bonded to the central portions. Disposed within the envelope are a capillary bore member, typically made of glass, having an "oversized" bore therethrough; and a metal cylinder in contact with one of the end members. The cylinder serves as the cathode electrode to which external connection is made via the end member in contact therewith, and the other end member serves as the anode electrode. The various parts can be manufactured simply and inexpensively by known pressing or punching and drawing techniques, and assembled by stacking and frit- and/or rf-sealing.

16 Claims, 2 Drawing Figures

PATENTED SEP 9 1975    3,904,986

GAS LASER TUBE

BACKGROUND OF THE INVENTION

This invention relates to a novel gas laser tube and, particularly, to a gas laser tube suitable for mass-production.

In a typical gas laser tube, a capillary bore member is disposed between two reflecting members or mirrors defining the laser optical resonant cavity. Usually, the capillary bore member is a quartz or glass tube, less than one inch in outer diameter and several inches long. The laser beam, itself, is defined by the inner diameter of the bore member, wherefor precision boring is required throughout its length. This dependence upon bore precision makes the typical gas laser tube a relatively-costly product to produce, especially by mass-production.

SUMMARY OF THE INVENTION

The novel gas laser tube comprises a gas-tight envelope having a longitudinal portion with opposite open ends sealed by metal end members. Each of the end members has an aperture therethrough in alignment with the bore of a capillary bore member disposed within the longitudinal portion of the envelope. At least one of the apertures is a precision aperture, and both apertures are sealed by reflecting means bonded to the end members. Electrode means are also disposed within the longitudinal portion, and a laser gas is sealed within the envelope.

Preferably, the diameter of the aperture through each end member is no greater than the minimum diameter of the bore through the bore member, so that the apertures can define the laser beam. Also preferably, the electrode means is a cathode electrically connected to one of the end members, and the other end member serves as an anode. Furthermore, each of the end members may have a curved central portion, within which the reflecting means or mirror is seated, and a flanged end portion, for facilitating mounting and external connection to the electrodes of the gas laser tube.

DESCRIPTION OF THE PREFERRED EMBODIMENTS

Figure 1:
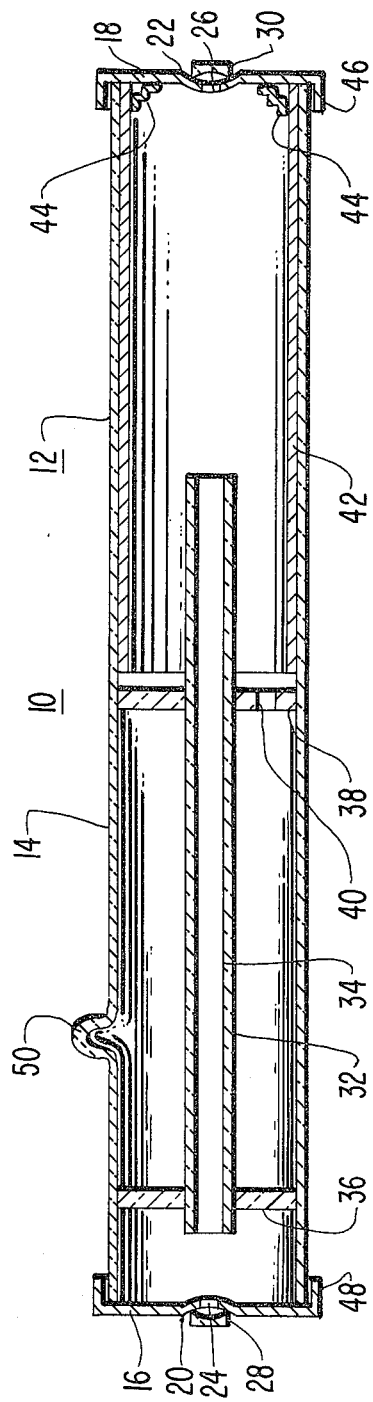
FIG. 1 is a longitudinal sectional view of an example of the novel gas laser tube.

An example of the novel gas laser tube is shown in FIG. 1, wherein the laser tube 10 comprises a gas-tight envelope 12 having a cylindrical, i.e., tubular, portion 14 made typically of No. 12 (lead) glass. The tubular portion 14 is sealed at one, e.g., the left, end to a first metal end member 16, made typically of No. 4 iron (with nickel, chromium, and cobalt) alloy, and at the other end to a second metal end member 18, also made typically of No. 4 alloy. Each of the end members 16 and 18 has a curved central portion 20 or 22, each forming a concave outer surface surrounding a respective precision aperture 24 or 26 through the central portion. Seated within the curved portions 20 and 22, and also bonded thereto, are first and second mirrors 28 and 30, respectively. The mirrors 28 and 30 seal the respective apertures 24 and 26, with which the mirrors are aligned.

Disposed within the envelope 12, and extending between the end members 16 and 18 and mirrors 28 and 30, is a capillary bore tube or member 32 also made typically of No. 12 glass. The bore member 32 has a longitudinal bore 34 therethrough, in coaxial relationship with the tubular portion 14 of the envelope 12 and also the end member apertures 24 and 26. The bore 34 has a minimum diameter no less than the diameter of the apertures 24 and 26, but is otherwise characterized as non-precise; that is, the bore 34 is generally "oversized." The bore member 32 is aligned within the envelope 12 by means of two support discs 36 and 38, each of which is attached to the bore member 32 and the envelope tubular portion 14. The support discs 36 and 38 are made typically of pressed glass; and one of the discs, e.g., disc 38, has an aperture 40 therethrough for passage of the laser gas, typically a mixture of helium and neon.

Also disposed within the envelope 12, adjacent the inner wall of the tubular portion 14 thereof, is a thin metal cylinder 42 made typically of aluminum. The cylinder 42 extends from one, e.g., the right, end of the envelope 12, in partially-overlapping relationship with the bore member 32, and is both mechanically and electrically connected to the second end member 18 by means of two metal spring-clips 44. The cylinder 42 serves as the cathode electrode of the laser tube 10; and external connection to the cathode electrode is made via the second end member 18, which has a flanged portion 46 also useful for mounting. The first end member 16, which itself has a flanged portion 48 useful for mounting, serves as the anode electrode of the laser tube 10. The bore 34, apertures 24 and 26, and mirrors 28 and 30 define the laser optical resonant cavity; and the precision apertures 24 and 26, rather than the inner diameter of the bore member 32, define the laser beam itself (not shown).

The laser tube 10 can be made from relatively simple, inexpensive parts. For example, the envelope tubular portion 14 may be an approximately 11-inch length of standard 1-inch outer diameter glass tubing; and the capillary bore member 32 may be an approximately 6.5-inch length of standard 300-mil outer diameter glass tubing, the oversized bore 34 therethrough having a diameter of about 60 ± 0.5 mils. The end members 16 and 18 may be punched or pressed from standard 10-mil metal stock, the apertures 24 and 26 therethrough being formed with 60-mil diameters to ± 0.1-mil precision. Assembly of the various parts comprises placing the support discs 36 and 38 about the bore member 32; disposing the support discs 36 and 38 and the cylinder 42 within the tubular portion 14; closing the tubular portion 14 with the end plate members 16 and 18; inserting a removable mandrel (not shown) through the bore member 32 and the end members 16 and 18; and sealing, e.g., by using conventional glass-frit sealing techniques, each of the support discs 36 and 38 to both the tubular portion 14 and the bore member 32 and each of the end members 16 and 18 also to the tubular portion 14. After the mandrel is removed, the mirrors 28 and 30 are seated in the curved portions 20 and 22, respectively, of the end members 16 and 18; aligned with the apertures 24 and 26, respectively, therethrough; and then bonded to the respective end members. Vacuum pumping, addition of the laser gas, and seal-off of the laser tube 10 are then effected via an appendage 50 extending from the tubular portion 14 of the gas-tight envelope 12.

Figure 2:
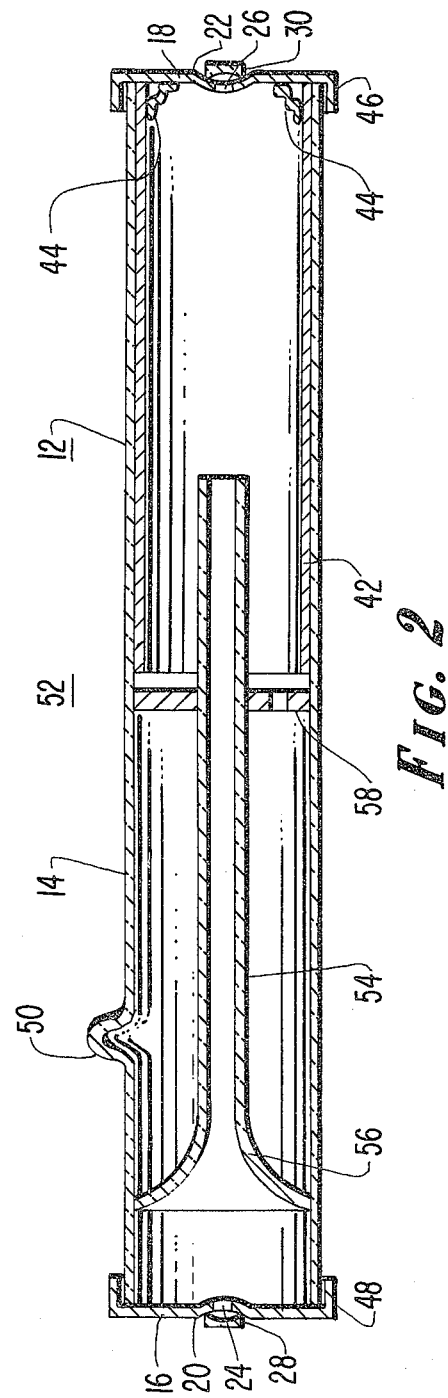
FIG. 2 is a longitudinal sectional view of another example of the novel gas laser tube.

Another example of the novel gas laser tube is shown in FIG. 2, wherein the laser tube 52 comprises some similar and other alternative features to those of the laser tube 10, shown in FIG. 1. That is, the laser tube 52 comprises a similar gas-type envelope 12 having a similar tubular portion 14 sealed at both ends thereof to similar first and second metal end members 16 and 18. Seated within the curved portions 20 and 22 of the end members 16 and 18, respectively, are similar first and second mirrors 28 and 30. Disposed within the envelope 12 is a similar cathode cylinder 42 mechanically and electrically connected to the second end member 18 by means of two similar springclips 44. But, whereas the capillary bore member 32 in FIG. 1 is simply an extended length of No. 12 glass tubing having an oversized bore 34 therethrough, the capillary bore member 54 in FIG. 2 also has a flared end portion 56 attached to the envelope tubular portion 14 adjacent the left end thereof. Furthermore, the pressed glass support disc 38 is replaced by a metal spacer 58, which is not sealed to either the envelope tubular portion 14 or the bore member 54. The method of making the laser tube 52 can be generally similar to the method of making the laser tube 10, with the obvious exception of the flared end portion 56 of the capillary bore member 54, which can be readily formed before the bore member is inserted or disposed within the tubular portion 14. Also, whereas the end members 16 and 18 were previously described as, for example, frit-sealed to the tubular portion 14, these parts may also be sealed using known rf-sealing techniques.

General Considerations

It should be understood that the invention is not limited to the embodiments described above. For example, the longitudinal portion of the gas-tight envelope may be other than cylindrical in shape; it may have a substantially oval or rectangular cross-section, which itself need not be uniform over its length. The metal end members need not both have precision apertures therethrough. Generally, at least one of the apertures should have a diameter no greater than the minimum diameter of the bore or the diameter of the other aperture. Also, various materials can be employed. The envelope longitudinal portion and capillary bore member may each (or both) be made, for example, of quartz, and the end members can be of a metal other than No. 4 alloy. Furthermore, the laser gas can be any of such known types as argon or a mixture of helium and cadmium.

As indicated above, the means for supporting the bore member within the longitudinal portion of the gas-tight envelope may comprise one or more support members, made of glass, metal or other material, sealed or not to the bore member and envelope longitudinal portion. Moreover, the support members may be similar in structure to the mesh-like discs or "grid elements" described in U.S. Pat. No. 3,683,295, issued on Aug. 8, 1972, also to K. G. Hernqvist, and employed successfully in., e.g., helium-cadmium lasers. The cathode structure, too, may vary from the thin metal cylinder shown in FIGS. 1 and 2.

What is claimed is:

1. A gas laser tube comprising:
   a. a gas-tight envelope having a longitudinal portion with opposite open ends;
   b. metal end members sealing said open ends of said envelope portion, each of said end members having an aperture therethrough;
   c. a capillary bore member disposed within said envelope portion and having a longitudinal bore aligned with said apertures through said end members;
   d. a different reflecting means bonded to each one of said end members and sealing each said aperture therethrough; said reflecting means forming an optical resonant cavity with said bore; at least one of said reflecting means being partially transparent for passage of an output laser beam;
   e. a laser gas within said envelope, and
   f. electrode means within said envelope for providing a gaseous discharge through said bore.

2. The laser tube of claim 1, wherein each of said end members has a curved portion within which said different reflecting means is seated.

3. The gas laser tube of claim 1, wherein said capillary bore member is made of glass.

4. The gas laser tube of claim 1, wherein each of said end members has a flanged portion external to said envelope.

5. The gas laser tube of claim 1, wherein said envelope portion is made of glass.

6. The gas laser tube of claim 5, wherein said envelope further contains means for sealing said bore tube to said envelope portion.

7. The gas laser tube of claim 6, wherein said sealing means comprises at least one support member sealed to both said bore tube and said envelope portion.

8. The gas laser tube of claim 6, wherein said sealing means comprises a flared end portion of said bore tube.

9. The gas laser tube of claim 1, wherein said gas is a mixture of helium and neon.

10. The gas laser tube of claim 1, wherein said envelope portion is cylindrical, said capillary bore tube being mounted within said envelope with said bore coaxial with said cylindrical envelope portion.

11. The gas laser of claim 1, wherein said longitudinal envelope portion is glass and said metal end members are rf-sealed across the open ends of said glass envelope portion.

12. The gas laser of claim 1, wherein said apertures extend through respective central portions of said metal end members, said central portions of said end members being curved and forming a concave outer surface surrounding each of said apertures, said reflecting means comprising a different mirror bonded to the concave outer surface of each end member.

13. The laser tube of claim 1, wherein said electrode means includes at least one of said end members.

14. The gas laser tube of claim 13, wherein said at least one metal end member is an anode electrode.

15. The gas laser tube of claim 14, wherein said electrode means includes a cathode electrode mounted within said envelope portion and electrically connected to the other one of said metal end members.

16. The gas laser tube of claim 15, wherein said cathode electrode comprises a metal cylinder in coaxial partially-overlapping relationship with said bore tube.

* * * * *